(12) United States Patent
Chen et al.

(10) Patent No.: US 7,639,152 B2
(45) Date of Patent: Dec. 29, 2009

(54) FAN FAILURE ALARM DEVICE

(75) Inventors: Ying Chen, Shenzhen (CN); Jin-Liang Xiong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 280 days.

(21) Appl. No.: 11/858,122

(22) Filed: Sep. 20, 2007

(65) Prior Publication Data
US 2008/0165020 A1    Jul. 10, 2008

(30) Foreign Application Priority Data
Jan. 8, 2007    (CN) .................... 2007 1 0200020

(51) Int. Cl.
*G08B 21/00*    (2006.01)
(52) U.S. Cl. .................. 340/671; 340/648; 340/506
(58) Field of Classification Search .......... 340/506, 340/508, 512, 513, 648, 671; 318/471, 473, 318/461, 400.01; 307/58
See application file for complete search history.

(56) References Cited
U.S. PATENT DOCUMENTS

| | | | | |
|---|---|---|---|---|
| 5,675,480 A * | 10/1997 | Stanford | ...................... | 307/58 |
| 5,677,672 A | 10/1997 | Vogt et al. | | |
| 5,880,678 A * | 3/1999 | Yu | ............................. | 340/671 |
| 6,135,718 A * | 10/2000 | Yang | ............................ | 417/22 |
| 6,709,111 B2 * | 3/2004 | Hirao et al. | .................... | 353/52 |
| 7,425,809 B2 * | 9/2008 | Shen et al. | .................. | 318/471 |
| 2008/0258664 A1 * | 10/2008 | Huang | ........................ | 318/461 |

* cited by examiner

*Primary Examiner*—Van T. Trieu
(74) *Attorney, Agent, or Firm*—Frank R. Niranjan

(57) ABSTRACT

A fan failure alarm device includes a first digital-analog converting circuit (200), a first diode (D11), a switching circuit (260), an input-output (I/O) controller (U11), and an alarm circuit (270). The first digital-analog converting circuit receives a digital pulse signal from a first fan, and outputs a direct current (DC) voltage signal at an output terminal. The first diode with a cathode coupled to the output terminal of the first digital-analog converting circuit, the first diode turns on when the first fan stops rotating. The switching circuit with an input terminal coupled to an anode of the first diode, outputs a first control signal when the fan rotates normally and outputs a second control signal when the fan stops rotating. The input-output (I/O) controller receives the first and second control signals from the switching circuit, and outputs an alarm signal when receives the second control signal. The alarm circuit receives the alarm signal from the I/O controller, and activates an alarm.

10 Claims, 1 Drawing Sheet

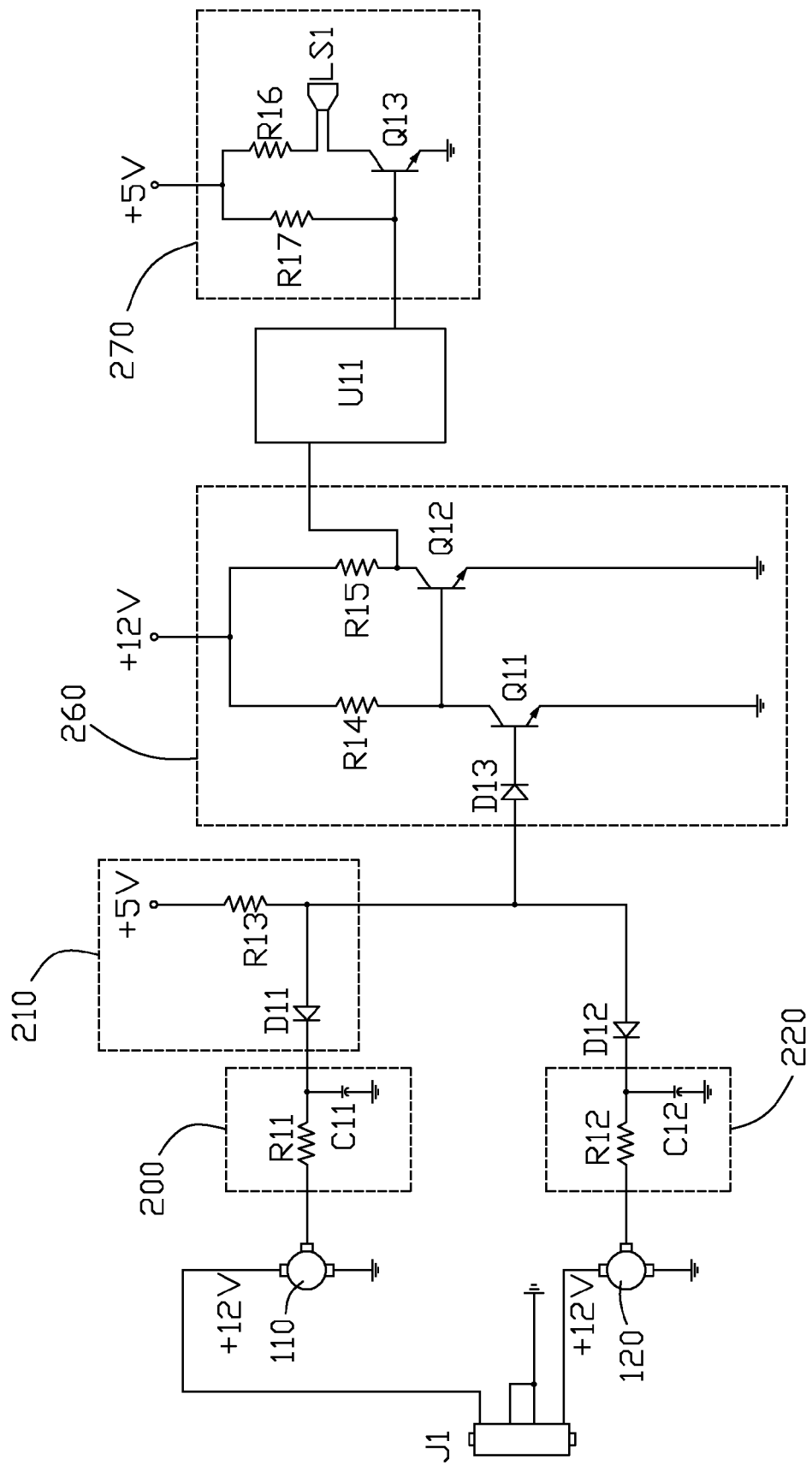

FAN FAILURE ALARM DEVICE

BACKGROUND

1. Field of the Invention

The present invention relates to alarm devices, and particularly to an alarm device for indicating a failure of a fan in a computer system.

2. Description of Related Art

Developments in today's highly information-intensive society have led to remarkable improvements in performances of electronic devices. During operation of many contemporary electronic devices such as central processing units (CPUs), large amounts of heat are produced. Typically, a fan is used to facilitate removal of heat. The fan must be running stably, so as to prevent the device from becoming unstable or being damaged. If the fan runs unstably or even ceases running, heat generated from the CPU will not be dissipated on time and will ruin the CPU.

What is needed, therefore, is to provide an alarm device for indicating a failure of a fan in a computer system.

SUMMARY

An exemplary alarm device for a fan includes a first digital-analog converting circuit, a first diode, a switching circuit, an input-output (I/O) controller, and an alarm circuit. The first digital-analog converting circuit receives a digital pulse signal from a first fan, and outputs a direct current (DC) voltage signal. The first diode with a cathode coupled to the output terminal of the first digital-analog converting circuit, the first diode turns on when the first fan stops rotating. The switching circuit with an input terminal coupled to an anode of the first diode, outputs a first control signal when the fan rotates normally and outputs a second control signal when the fan stops rotating. The input-output (I/O) controller receives the first and second control signals from the switching circuit, and outputs an alarm signal when it receives the second control signal. The alarm circuit receives the alarm signal from the I/O controller, and activates an alarm.

Other objects, advantages and novel features of the present invention will become more apparent from the following detailed description of preferred embodiments when taken in conjunction with the accompanying drawings, in which:

BRIEF DESCRIPTION OF THE DRAWINGS

The drawing is a circuit diagram of an embodiment of an alarm device for a fan in accordance with the present invention.

DETAILED DESCRIPTION

Referring to the drawing, an alarm device for a fan in accordance with an embodiment of the present invention includes a first digital-analog converting circuit 200 coupled to a first fan 110, a second digital-analog converting circuit 220 coupled to a second fan 120, two diodes D11, D12, a switching circuit 260, an input-output (I/O) controller U11, and an alarm circuit 270.

In this embodiment, the first digital-analog converting circuit 200 includes a resistor R11 and a capacitor C11. One terminal of the resistor R11 is coupled to the first fan 110, the other terminal of the resistor R11 is coupled to one terminal of the capacitor C11, the other terminal of the capacitor C11 is coupled to ground. The second digital-analog converting circuit 220 includes a resistor R12 and a capacitor C12. One terminal of the resistor R12 is coupled to the second fan 120, the other terminal of the resistor R12 is coupled to one terminal of the capacitor C12, the other terminal of the capacitor C12 is coupled to ground. A node between the resistor R11 and the capacitor C11 is coupled to the cathode of the diode D11. A node between the resistor R12 and the capacitor C12 is coupled to the cathode of the diode D12.

The switching circuit 260 includes a first transistor Q11, a second transistor Q12, and a diode D13. The base of the first transistor Q11 is coupled to the cathode of the diode D13, the anode of the diode D13 is coupled to the anodes of the diodes D11, D12, the anode of the diode D13 is also coupled to a 5 volt power supply via a resistor R13, the collector of the first transistor Q11 is coupled to the base of the second transistor Q12, and coupled to a 12 volt power supply via a resistor R14. The collector of the second transistor Q12 is coupled to an input terminal of the I/O controller U11, and coupled to the 12 volt power supply via a resistor R15, the emitters of the first and second transistors Q11, Q12 are coupled to ground.

The alarm circuit 270 includes a transistor Q13 and a buzzer LS1. The base of the transistor Q13 is coupled to an output terminal of the I/O controller U11, and coupled to the 5 volts power supply via a resistor R17, the collector of the transistor Q13 is coupled to one terminal of a resistor R16 via the buzzer LS1, the other terminal of the resistor R16 is coupled to the 5 volt power supply, the emitter of the transistor Q13 is coupled to ground.

The first and second fans 110, 120 respectively receive a 12V direct current voltage from a power supply J1 and are driven by the power supply J1. When the first and second fans 110, 120 rotate normally, the first and second fans 110, 120 respectively output a digital pulse signal. The diodes D11, D12 are off, a voltage at the base of the first transistor Q11 is pulled up to a high level by the 5 volt power supply, the first transistor Q11 turns on, the second transistor Q12 is off, the switching circuit 260 outputs a high level voltage signal to the I/O controller U11, the I/O controller U11 outputs a low level control signal to the alarm circuit 270, the transistor Q13 is off, and the buzzer LS1 is not activated.

If either or both of the fans 110, 120 stop rotating then the failed fan or fans 110, 120 will not output a digital pulse signal. In that case, one or both of the diodes D11, D12 turn on, a voltage at the base of the first transistor Q11 is pulled down to a low level by the diode which is on, the first transistor Q11 turns off, the second transistor Q12 turns on, the switching circuit 260 outputs a low level voltage signal to the I/O controller U11, the I/O controller U11 outputs a high level control signal to the alarm circuit 270, the transistor Q13 turns on, and the buzzer LS1 is activated to sound an alarm indicating that one or both of the fans 110, 120 have failed.

In this embodiment, the switching circuit 260 outputs the low level voltage signal to the I/O controller U11 when either or both of the first and second fans 110, 120 stops rotating, the I/O controller U11 outputs the high level control signal to the alarm circuit 270 and activates the buzzer LS1. The diode D13 counteracts the high voltage caused by the diodes D11, D12, so that the first transistor Q11 does not turn on even though the first and/or second fan 110, 120 are rotating.

The foregoing description of the exemplary embodiment of the invention has been presented only for the purposes of illustration and description and is not intended to be exhaustive or to limit the invention to the precise forms disclosed. Many modifications and variations are possible in light of the above teaching. The embodiment was chosen and described in order to explain the principles of the invention and its practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiment described therein.

What is claimed is:

1. A fan failure alarm device comprising:
   a first digital-analog converting circuit configured for receiving a digital pulse signal from a first fan, and outputting a direct current (DC) voltage signal at an output terminal;
   a first diode with a cathode coupled to the output terminal of the first digital-analog converting circuit, the first diode turning on when the first fan stops rotating;
   a switching circuit with an input terminal coupled to an anode of the first diode, and outputting a first control signal when the fan rotates normally and outputting a second control signal when the fan stops rotating;
   an input-output (I/O) controller with an input terminal receiving the first and second control signals from the switching circuit, and an output terminal outputting an alarm signal when receives the second control signal; and
   an alarm circuit configured for receiving the alarm signal from the I/O controller, and activating an alarm to indicate a failure of the fan.

2. The fan failure alarm device as claimed in claim 1, wherein the first digital-analog converting circuit comprises a first resistor and a capacitor, one terminal of the first resistor is coupled to the first fan, another terminal of the first resistor is coupled to one terminal of the capacitor, another terminal of the capacitor is coupled to ground, a node between the first resistor and the capacitor acting as the output terminal of the first digital-analog converting circuit coupled to the cathode of the first diode.

3. The fan failure alarm device as claimed in claim 1, wherein the switching circuit comprises a first transistor, a second transistor, and a second diode, a base of the first transistor is coupled to a cathode of the second diode, an anode of the second diode acting as an input terminal of the switching circuit respectively coupled to a first power supply and the anode of the first diode, a collector of the first transistor is respectively coupled to a base of the second transistor and a second power supply, a collector of the second transistor is respectively coupled to the second power supply and the input terminal of the I/O controller, emitters of the first and second transistors are coupled to ground.

4. The fan failure alarm device as claimed in claim 3, wherein the switching circuit further comprises a second resistor, a third resistor, and a fourth resistor, the anode of the second diode is coupled to the first power supply via the second resistor, collectors of the first and second transistors are coupled to the second power supply respectively via the third and fourth resistors.

5. The fan failure alarm device as claimed in claim 3, further comprising a second digital-analog converting circuit, and a third diode, wherein the second digital-analog converting circuit comprises a resistor and a capacitor, one terminal of the resistor is coupled to a second fan, another terminal of the resistor is coupled to one terminal of the capacitor, another terminal of the capacitor is coupled to ground, a cathode of the third diode is coupled to a node between the resistor and the capacitor, an anode of the third diode is coupled to the anode of the second diode.

6. The fan failure alarm device as claimed in claim 1, wherein the alarm circuit comprises a transistor, a buzzer, a fifth resistor, and a sixth resistor, a base of the transistor is coupled to the output terminal of the I/O controller, the base of the transistor is coupled to a first power supply via the fifth resistor, an emitter of the transistor is coupled to ground, a collector of the transistor is coupled to one terminal of the sixth resistor via the buzzer, another terminal of the sixth resistor is coupled to the first power supply.

7. An alarm device comprising:
   a first digital-analog converting circuit configured to electrically couple to a first fan to receive a digital pulse signal from the first fan when the first fan rotates normally, and output a direct current (DC) voltage signal in response to the digital pulse signal at an output terminal;
   a first diode with a cathode coupled to the output terminal of the first digital-analog converting circuit, the first diode turning off when the first fan rotates normally and turning on when the first fan stops rotating;
   a second digital-analog converting circuit configured to electrically couple to a second fan to receive a digital pulse signal from the second fan when the second fan rotates normally, and output a direct current (DC) voltage signal in response to the digital pulse signal at an output terminal;
   a second diode with a cathode coupled to the output terminal of the second digital-analog converting circuit, the second diode turning off when the second fan rotates normally and turning on when the second fan stops rotating;
   a switching circuit with an input terminal coupled to anodes of the first and second diodes, and an output terminal outputting a control signal when one or more of the first and second fans stops rotating;
   an input-output (I/O) controller coupled to the output terminal of the switching circuit for receiving the control signal and outputting an alarm signal; and
   an alarm circuit configured to receive the alarm signal from the I/O controller, and activate an alarm to indicate a failure of said one or more of the first and second fans.

8. The alarm device as claimed in claim 7, wherein the switching circuit comprises a first transistor, a second transistor, and a third diode, a base of the first transistor is coupled to a cathode of the third diode, an anode of the third diode acting as an input terminal of the switching circuit respectively coupled to a first power supply and the anodes of the first and second diodes, a collector of the first transistor is respectively coupled to a base of the second transistor and a second power supply, a collector of the second transistor is respectively coupled to the second power supply and the I/O controller, emitters of the first and second transistors are coupled to ground.

9. The alarm device as claimed in claim 7, wherein the first digital-analog converting circuit comprises a first resistor and a first capacitor, one terminal of the first resistor is coupled to the first fan, another terminal of the first resistor is coupled to one terminal of the first capacitor, another terminal of the first capacitor is coupled to ground, a node between the first resistor and the first capacitor acting as the output terminal of the first digital-analog converting circuit coupled to the cathode of the first diode.

10. The alarm device as claimed in claim 9, wherein the second digital-analog converting circuit comprises a second resistor and a second capacitor, one terminal of the second resistor is coupled to the second fan, another terminal of the second resistor is coupled to one terminal of the second capacitor, another terminal of the second capacitor is coupled to ground, a node between the second resistor and the second capacitor acting as the output terminal of the second digital-analog converting circuit coupled to the cathode of the second diode.

* * * * *